(12) United States Patent
Fletcher et al.

(10) Patent No.: US 9,318,271 B2
(45) Date of Patent: Apr. 19, 2016

(54) HIGH TEMPERATURE SUPERCAPACITOR

(71) Applicant: SCHLUMBERGER TECHNOLOGY CORPORATION, Sugar Land, TX (US)

(72) Inventors: Stephen Fletcher, Loughborough (GB); Victoria Black, Wallasey (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 70 days.

(21) Appl. No.: 13/923,059

(22) Filed: Jun. 20, 2013

(65) Prior Publication Data

US 2013/0342962 A1 Dec. 26, 2013

Related U.S. Application Data

(60) Provisional application No. 61/662,451, filed on Jun. 21, 2012.

(51) Int. Cl.
*H01G 9/00* (2006.01)
*H01G 11/18* (2013.01)
(Continued)

(52) U.S. Cl.
CPC .............. *H01G 11/18* (2013.01); *H01G 11/14* (2013.01); *H01G 11/24* (2013.01); *H01G 11/28* (2013.01); *H01G 11/62* (2013.01); *H01G 11/64* (2013.01); *H01G 11/70* (2013.01); *Y02E 60/13* (2013.01)

(58) Field of Classification Search
CPC .......... H01G 9/012; H01G 9/00; H01G 9/15; H01G 11/18; H01G 11/24; H01G 11/28
USPC ......... 361/502, 503–504, 517–518, 523–525, 361/528–529, 535–536
See application file for complete search history.

(56) References Cited

U.S. PATENT DOCUMENTS 5,586,000 A * 12/1996 Sakata et al. .................. 361/525
6,517,892 B1 * 2/2003 Sakai et al. ..................... 427/80
(Continued)

FOREIGN PATENT DOCUMENTS

CN 1317809 A 10/2001
CN 1538470 A 10/2004
(Continued)

OTHER PUBLICATIONS

International search report for the equivalent PCT patent application No. PCT/7S2013/047036 issue on Sep. 25, 2013.
(Continued)

*Primary Examiner* — Nguyen T Ha

(57) ABSTRACT

A supercapacitor device having a housing and at least one supercapacitor cell disposed in the housing, where the supercapacitor cell may include: two working electrode layers separated by an electrode separator wherein each working electrode layer is electrically connected to a current collector supported upon an inert substrate layer; an electrolyte-impervious layer disposed between each working electrode layer and each conducting layer to protect the conducting layer; and an ionic liquid electrolyte disposed within the area occupied by the working electrode layers and the electrode separator, wherein the ionic liquid electrolyte has at least one cationic component comprising a central cation with an asymmetric arrangement of substituents bonded thereto. The ionic liquid electrolyte may be gelled by a silica gellant to inhibit electrolyte flow. The operating range of the supercapacitor device is at least 20-220° C.

27 Claims, 4 Drawing Sheets

(51) Int. Cl.
*H01G 11/24* (2013.01)
*H01G 11/28* (2013.01)
*H01G 11/62* (2013.01)
*H01G 11/14* (2013.01)
*H01G 11/64* (2013.01)
*H01G 11/70* (2013.01)

(56) References Cited

U.S. PATENT DOCUMENTS

| | | | |
|---|---|---|---|
| 8,149,552 B1* | 4/2012 | Cordill | 361/42 |
| 8,659,874 B2 | 2/2014 | Shaffer et al. | |
| 8,669,114 B2* | 3/2014 | Sundermeyer et al. | 436/161 |
| 8,760,851 B2* | 6/2014 | Signorelli et al. | 361/502 |
| 2003/0081372 A1* | 5/2003 | Nakazawa et al. | 361/502 |
| 2004/0021928 A1 | 2/2004 | Warner et al. | |
| 2006/0124318 A1 | 6/2006 | Sheffield | |
| 2006/0164790 A1* | 7/2006 | Takeuchi | H01G 9/038 361/502 |
| 2008/0010796 A1 | 1/2008 | Pan et al. | |
| 2009/0023954 A1* | 1/2009 | Sueto et al. | 564/14 |
| 2009/0053597 A1* | 2/2009 | Tsunashima et al. | 429/188 |
| 2009/0059474 A1 | 3/2009 | Zhamu et al. | |
| 2009/0316336 A1 | 12/2009 | Fan | |
| 2010/0239916 A1 | 9/2010 | Bhattacharryya et al. | |
| 2010/0304223 A1* | 12/2010 | Otsuki | H01G 9/038 429/324 |
| 2011/0026189 A1 | 2/2011 | Wei et al. | |
| 2011/0204020 A1 | 8/2011 | Ray et al. | |
| 2013/0095351 A1* | 4/2013 | Gellett | H01G 9/2013 429/9 |

FOREIGN PATENT DOCUMENTS

| | | |
|---|---|---|
| CN | 101606212 A | 12/2009 |
| EP | 2338204 A1 | 6/2011 |
| JP | 3872494 B1 | 1/2007 |
| JP | 2008182182 A | 8/2008 |
| WO | 2012056050 A2 | 5/2012 |

OTHER PUBLICATIONS

Office Action issued in CN application 201380025129.1 on Aug. 19, 2015, 21 pages.
Extended European Search Report issued in corresponding EP Application No. 15178281.0 mailed Nov. 3, 2015.
Office Action issued in corresponding Vietnamese App. No. 1-2014-04290 mailed Sep. 29, 2015.
Written Opinion issued in corresponding International App. No. PCT/US2013/047036 mailed Sep. 25, 2013.
Search Report issued in related EP application 13806254.2 on Dec. 9, 2015, 3 pages.
Article 94(3) EPC issued in related EP application 13806254.2 on Jan. 4, 2016, 5 pages.

* cited by examiner

HIGH TEMPERATURE SUPERCAPACITOR

CROSS-REFERENCE TO RELATED APPLICATIONS

This application claims the benefit of U.S. Provisional Patent Application Ser. No. 61/662,451 filed on Jun. 21, 2012, which is incorporated herein by reference in its entirety.

BACKGROUND

Wells are generally drilled into the ground to recover natural deposits of oil and gas or other minerals that are trapped in geological formations. To drill a well, a drill bit is connected on the lower end of an assembly of drill pipe sections that are connected end-to-end so as to form a "drill string." The bit is rotated by rotating the drill string at the surface or by actuation of downhole motors or turbines, or by both methods. A drilling fluid is pumped down through the drill string to the drill bit where it exits and carries drilled cuttings away from the bottom hole to the surface through the annulus between the drill string and the borehole wall.

In addition to the drill bit, the bottom hole assembly ("BHA") commonly includes other tools, sensors, or equipment thereon used in the drilling process. Downhole tools may also be suspended in the wellbore on a wireline, which is lowered into the wellbore after the drilling process has completed or during interruptions in the drilling process when the drill string has been removed from the well.

Many of the tools, sensors, and other equipment used in downhole applications use electrical power in order to operate or actuate the device. Tools located on the drill string may be powered by a turbine or other motor through which the drilling fluid is circulated. However, when there is a lack of fluid circulation (or when the tool is located on a wireline), auxiliary power may be required. This auxiliary power may be in the form of a battery or supercapacitor that is attached to the downhole tool.

Downhole devices, including independent power sources, are configured to be able to withstand severe operating conditions (as compared to those devices used on the surface), principally higher temperatures and pressures than those experienced on the surface. High levels of vibration may also be encountered. In general, downhole pressure increases with depth into the formation, and to balance this pressure the hydrostatic pressure of the drilling fluid in the wellbore is increased commensurately. In addition to increased pressures, temperatures experienced downhole also generally increases with depth into the formation. Thus, downhole tools often operate in a high temperature environment where temperatures may exceed 125° C., which is higher than the normal operating range of commercial power sources (less than 80° C.).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a supercapacitor device having a housing and at least one supercapacitor cell disposed in the housing. The supercapacitor cell may include: two working electrode layers separated by an electrode separator where each working electrode layer is electrically connected to a current collector supported upon an inert substrate layer; an electrolyte-impervious layer disposed between each working electrode layer and each conducting layer to protect the conducting layer; and an ionic liquid electrolyte disposed within the area occupied by the working electrode layers and the electrode separator. The ionic liquid electrolyte has at least one cationic component comprising a central cation with an asymmetric arrangement of substituents bonded thereto.

In another aspect, embodiments disclosed herein relate to a supercapacitor device having a housing and at least one supercapacitor cell disposed in the housing. The supercapacitor cell may include: two working electrode layers separated by an electrode separator where each working electrode layer is electrically connected to a current collector supported upon an inert substrate layer; an electrolyte-impervious layer disposed between each working electrode layer and each conducting layer to protect the conducting layer; and an electrolyte disposed within the area occupied by the working electrode layers and the electrode separator, the electrolyte comprising a continuous phase of an inert ionic liquid.

In yet another aspect, embodiments disclosed herein relate to a downhole system having a supercapacitor device which may include: at least one downhole tool disposed within a wellbore; and a supercapacitor device in electrical connection with the at least one downhole tool.

Other aspects and advantages of the claimed subject matter will be apparent from the following description and the appended claims.

DETAILED DESCRIPTION

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Embodiments of the present disclosure are related to high temperature supercapacitors as well as methods of making and using such supercapacitors. Particular embodiments may involve the use of such supercapacitors in a downhole environment to provide a power source to downhole tools. In one or more embodiments the present disclosure is directed to the electrolyte components used in such supercapacitors that may allow for use at wide operating conditions, including high pressure and high temperature downhole environments as well as room temperature environments.

Supercapacitor Components

Figure 2:
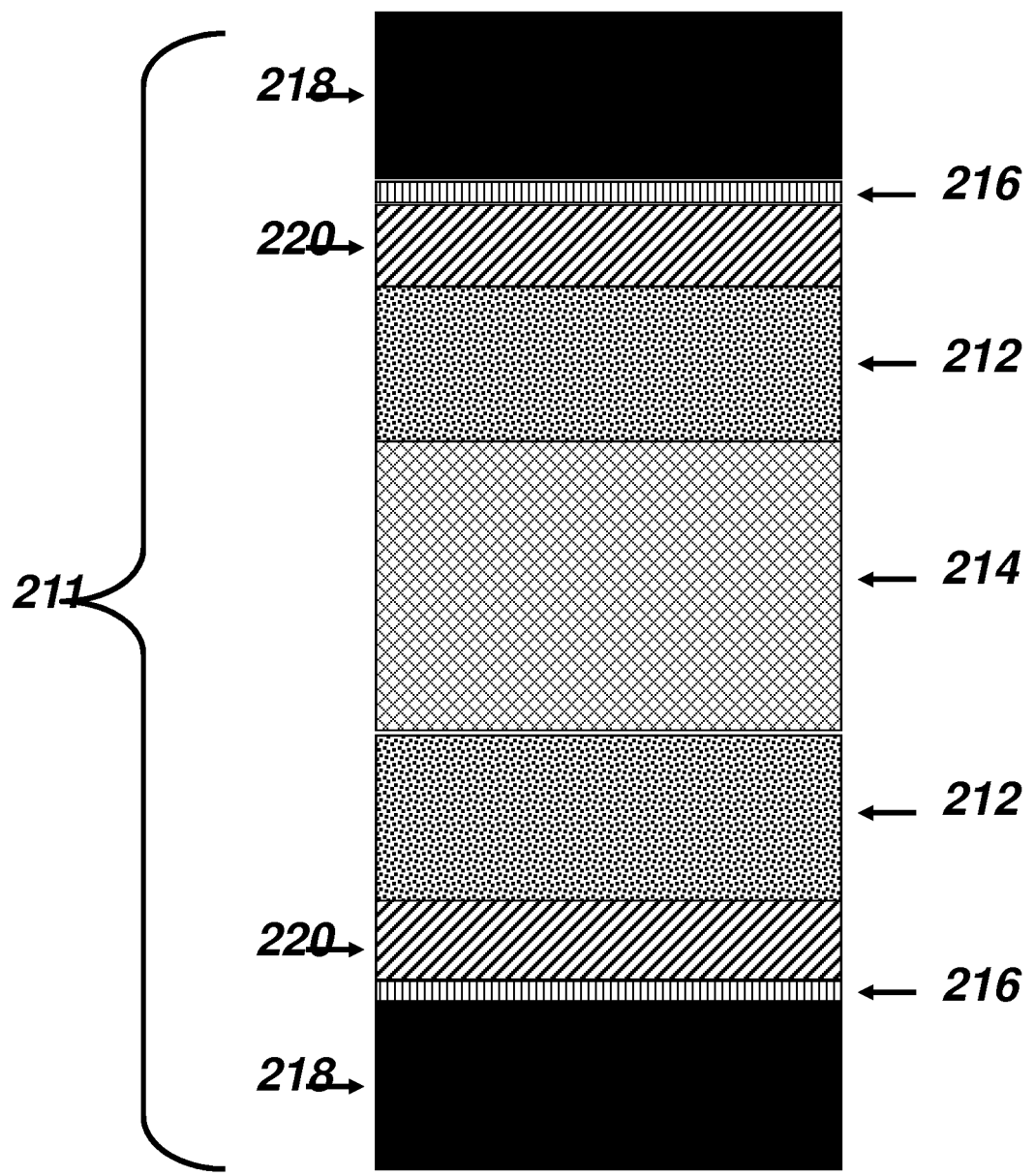
FIG. 2 is a cross-sectional schematic view of an embodiment of a high temperature supercapacitor cell of the present disclosure.

Referring to FIG. 2, a schematic cross-sectional view of a supercapacitor cell according to one or more embodiments is shown. A supercapacitor device includes at least one supercapacitor cell (211), as shown in FIG. 2, disposed within a housing (not shown). A single supercapacitor cell (211) of a particular embodiment may include two working electrode layers (212) which are separated by an electrode separator (214). The separator is designed to prevent electrical short circuits whilst allowing the transport of ionic species between either electrode. The working electrode layers (212) are electrically connected to current collectors (216), which are supported upon inert substrate layers (218). The current collectors (216) may be physically protected from the environment of the working electrode layers (212) by electrolyte-impervious layers (220). Further, the supercapacitor cell (211) may include an electrolyte dispersed throughout the working layers and electrode separator (214). In operation, a current is passed between the working electrodes to polarize them either positively or negatively. In response, the ionic species within the electrolyte migrate towards the oppositely charged electrodes, charging the capacitor. Each of these components will be addressed in turn.

In one or more embodiments, the working electrode layers (212) may comprise a porous carbonaceous material applied as a layer on the conducting layer (current collector). As used herein, porous refers to a material having a large specific surface area (greater than 300 m$^2$ g$^{-1}$), which is accessible via a network of pores which may contain any combination of large micropores (1-2 nm diameter), mesopores (2-50 nm diameter), and/or small macropores (50-500 nm). Thus, in one or more embodiments, the specific surface area may be about 1900 m$^2$ g$^{-1}$. Further, the thickness of the working electrode may generally range from 1 μm-2000 μm. In general, the amount of energy stored in a single supercapacitor cell is proportional to the accessible surface area of the porous carbonaceous material. Hence, maximization of the interfacial area between the working electrodes and the electrolyte is a desirable design feature. In one or more embodiments, the porous carbonaceous material may include activated carbon, carbon black, carbon nanotubes, graphene and its derivatives, carbon aerogels, or combinations thereof. In one or more embodiments, the porous material chosen for pairs of working electrodes may have identical composition; however, the present disclosure is not so limited.

An electrode separator (214) may be inserted between the working electrodes (212) in order to prevent electrical short circuits whilst allowing the transport of ionic species between the supercapacitor cell compartments. In one or more particular embodiments, the electrode separator (214) should possess sufficient porosity to allow for efficient electrolyte transport between the working electrodes (212). In one or more embodiments, the electrode separator may include glass fibers or other non-conducting fibers. The fibers may have a fiber diameter in the range 1-20 micrometers and an average fiber length of at least 5 millimeters. They may be in the form of woven material, compressed matting or glass wool. In one or more embodiments, they should have high electrolyte retention, high tensile strength, good shape recovery, and be chemically inert. Other non-conducting fibers which are stable at temperatures above 125° C. and capable of being used in certain embodiments include alumina, mullite, silicon carbide and zirconia.

The working electrode layers (212) are electrically connected to the current collectors (216). In one or more embodiments, the current collectors (216) may include a conducting material such as carbon, aluminum, gold, silver, copper, or mixtures thereof. Each current collector (216), while electrically connected to a working electrode layer (216), may also be adjacent to an electrolyte-impervious layer (220) which protects the current collector (216) from chemical reaction with the electrolyte solution. In one or more embodiments, the electrolyte-impervious layer may comprise a substantially non-porous carbonaceous composite material or other substantially non-porous inert material, which may be physically distinct from the current collectors (216).

The current collector (216) is supported by an inert substrate (218) which forms the outer layer of the supercapacitor cell (211). The inert substrate (218) may comprise any inert material suitable to withstand downhole conditions of high temperature and pressure. In more particular embodiments, the inert substrate may be a glassy or polymeric material. No limitation on the type of inert substrate exists, but any material that can provide the physical structure on which the supercapacitor cell layers may be formed is within the scope of the present disclosure.

Dispersed throughout the internal space of the supercapacitor cell is the electrolyte. In one or more embodiments, the electrolyte is an inert ionic liquid or continuous phase of inert ionic liquid. In more particular embodiments, the electrolyte is an inert ionic liquid with at least one cationic component with an asymmetric arrangement of substituents bonded to at least one central cationic component. In yet a more particular embodiment, the asymmetric arrangement of substituents is generated by incorporating substituents of diverse sizes.

In a yet more particular embodiment, the cationic component has the generic formula $(R_x)_n Z^+$ where $Z^+$ is the ammonium, phosphonium, or sulfonium cation, the $R_x$ substituents are linear or branched alkyl groups comprising 1-12 carbon atoms and may be the same alkyl group or different alkyl groups, n=4 for the ammonium and phosphonium cations, and n=3 for the sulfonium cation. In a yet more particular embodiment, at least one alkyl group has a different size relative to the others. This guarantees the asymmetric nature of the cation. For example, in one or more embodiments, at least one alkyl group may range from C1-C3, while at least one alkyl group may be greater than C4. In general, increasing the asymmetry of the cation decreases the melting point of the ionic liquid, and thus substantially extends the range of operating temperatures in both above-ground and downhole situations. Further, increasing the size of the substituent groups also diminishes the probability of electron tunneling and protects the cation from electron transfer, which allows the supercapacitor device to function over a wider voltage stability window.

In particular embodiments, the ionic liquid electrolyte may include hexyltriethylammonium cations and/or butyltrimethylammonium cations paired with bis(trifluoromethylsulfonyl)imide anions, the chemical structures of which are shown below.

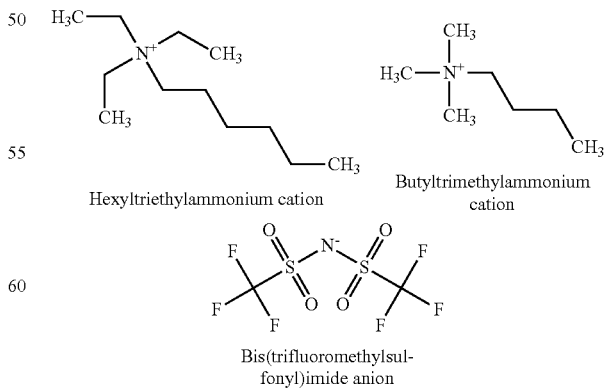

Hexyltriethylammonium cation

Butyltrimethylammonium cation

Bis(trifluoromethylsulfonyl)imide anion

In one or more embodiments, the ionic liquid may constitute substantially the entire electrolyte phase or at least a substantial portion of the electrolyte phase. In other embodiments, the ionic liquid may provide the conducting component of the electrolyte solution in the presence of either aqueous or non-aqueous diluents. Typical non-aqueous diluents include alcohols, nitriles, dimethylacetamide, dimethylformamide and dimethyl sulfoxide. These diluents may be present in any ratio by volume.

In one or more embodiments, the ionic liquid electrolyte phase may further include a viscosifier added thereto to modify the viscosity of the electrolyte to substantially immobilize the ionic liquid electrolyte (so that the liquid does not undergo convective flow into undesired locations) but still allows for internal diffusion of the ions therein. In one or more embodiments, the viscosifier may include a silica gellant. In more particular embodiments, the silica gellant may be added to the ionic liquid electrolyte in an amount from about 1 to 15 weight % of the total weight of the electrolyte phase. In more particular embodiments, the silica gellant may be added to the ionic liquid electrolyte in an amount from about 3 to 10 weight % of the total weight of the electrolyte phase, or from 6 to 8 weight % of the total weight in yet other embodiments. In a further embodiment, the silica gellant is a fumed silica with either hydrophobic or hydrophilic characteristics and a BET surface area of greater than $300 \text{ m}^2 \text{ g}^{-1}$.

The supercapacitor cell as described above may be fabricated using any means known in the art, with no limitation. Generally, the component layers included in the supercapacitor cell may be applied or deposited sequentially onto the preceding layer until the structure as described above is generated.

In more particular embodiments, a plurality of supercapacitor cells as described in the embodiments above may further be connected in series to achieve a greater voltage. Alternatively, a plurality of supercapacitor cells as described in the embodiments above may be connected in parallel to achieve a greater capacitance.

The housing (not shown) may be a steel can in which at least one supercapacitor cell is deposited. The particular material used to form the housing does not limit the scope of the present disclosure. Rather, one skilled in the art will appreciate that the housing may be selected to be sufficiently capable of withstanding the high G-forces, temperatures, pressures and corrosive environment experienced downhole within the wellbore. Alternative housing compositions may employ titanium, carbon reinforced alloys, and any other alloys, solid solutions or intermetallics that can retain structural integrity within the downhole environment. Further, it is also within the scope of the present disclosure that one or more components may be used to form the housing (not shown) including separate end pieces such as base plates (not shown) attached to the inert substrate layers. One skilled in the art would appreciate that separate end pieces (at both ends of the cell) may be desired for manufacturing ease. When multiple pieces are used to form the housing, one of ordinary skill in the art would appreciate that a hermetic seal may be formed between the multiple components. The supercapacitor cell structure disclosed above may be included in any fashion within the housing. That is, the supercapacitor cell or plurality of connected supercapacitor cells may be rolled, folded or stacked into cylindrical or rectangular shapes within the housing.

Application of the Supercapacitor in Oilfield Use

Figure 1:
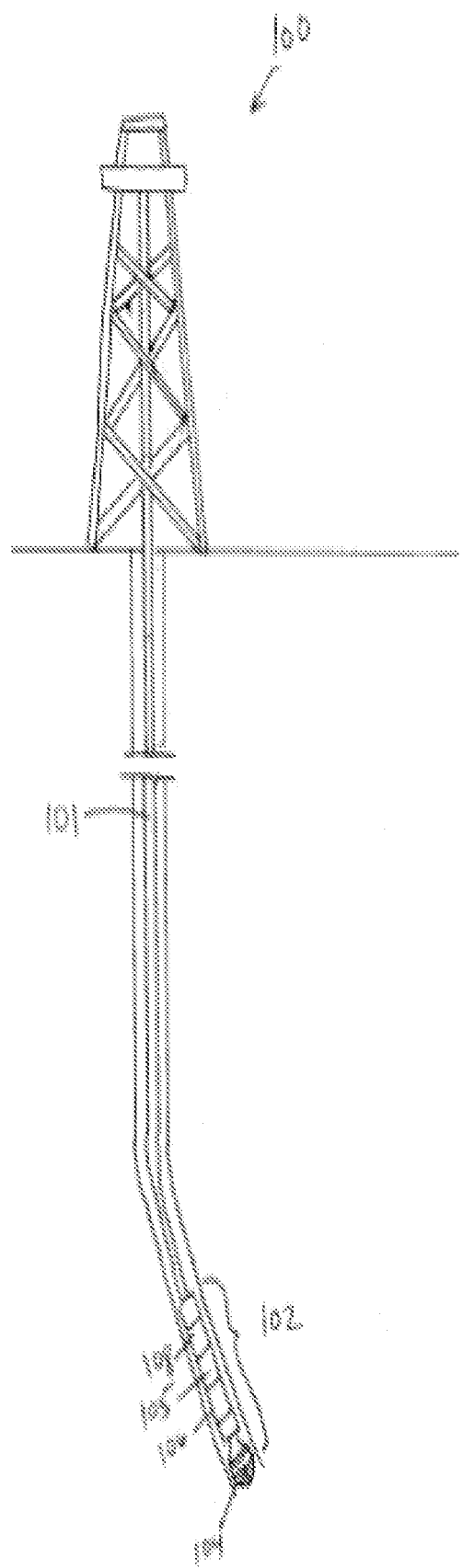
FIG. 1 illustrates an example system in which the embodiments of the supercapacitor device may be implemented in a borehole.

In general, some embodiments are related to methods of charging/recharging and/or discharging a supercapacitor device in oilfield applications. As illustrated in FIG. 1, a drilling system (100) includes a bottom hole assembly (102) connected at the bottom end of a drill string (101) suspended within a wellbore. The bottom hole assembly (102) may include a drill bit (104) at the lowermost end of the bottom hole assembly (102), a drill collar (106), and a motor (108). One or more other downhole tools may be located anywhere along the drill string (101) or along a wireline (not shown) in the wellbore when the drill string (101) and bottom hole assembly (102) are removed from the well. Further, in accordance with one or more embodiments, a supercapacitor device (105) may be located along the drill string (101) or on a wireline (not shown) and thus any tubular string in a drilling system, and may be electrically connected to any downhole tool, such as a MWD, LWD, sensor, or other actuable tool needing a power source to provide power thereto. In particular embodiments, the supercapacitor device may be electrically connected to a component of motor (108) to receive energy therefrom so that the supercapacitor device may be charged while downhole. It should be understood that no limitation is intended by the arrangement of the drilling system, including the presence of absence of one or more components. As mentioned above, it is also envisioned that the drill string (101) may also be replaced by structures such as a wireline or any other apparatuses to convey the supercapacitor device (105) into the wellbore, where the supercapacitor device is electrically connected to one or more tools located on the wireline. When electrically connected to one or more tools, including sensors and/or other downhole tools, the supercapacitor device provides electrical power required for operation to said tools. Further, in one or more embodiments, the supercapacitor device may be used in conjunction with a battery, and may be connected in series with said battery.

In this disclosure, components that are "electrically connected" are connected in such a way that electric current may flow between the components. Components that are electrically connected may include additional components that are connected between them. In addition, in some cases, a switch may be electrically connected to various components in a circuit. Even though a switch may be in an open position, which would break the circuit and prevent electrical flow, this does not prevent components from being electrically connected in accordance with the present disclosure. A switch is intended to be closed at certain times, and at those times, electrical current may flow between the components that are electrically connected.

In general, in some embodiments, the supercapacitor device may be charged/recharged by a motor or turbine that generates energy from wellbore fluid flow therethrough. The mechanism involved in charging/recharging the supercapacitor device would simply be using the energy generated by the motor or turbine to pass a current to the working electrodes as is required to charge the supercapacitor cells. It is also within the scope of the present disclosure that the supercapacitor device disclosed herein may be charged at the surface after being returned to the surface as well as being charged downhole during the drilling process, with no limitation on the particular method(s) that may be used for charging the supercapacitor device.

EXAMPLES

Example 1

A supercapacitor cell was constructed according to the abovementioned description. The two working electrode layers were formed from activated carbon. Each conducting layer was formed from silver metal. Separating each working electrode from its corresponding conducting layer was a layer of electrolyte-impervious smooth carbon. Glass was the inert substrate used. Glass fibers were used as the electrode separator material. The electrolyte utilized was an ionic liquid electrolyte composed of hexyltriethylammonium cations and bis(trifluoromethylsulfonyl)imide anions. The voltammetric response thereof was measured.

Figure 3:
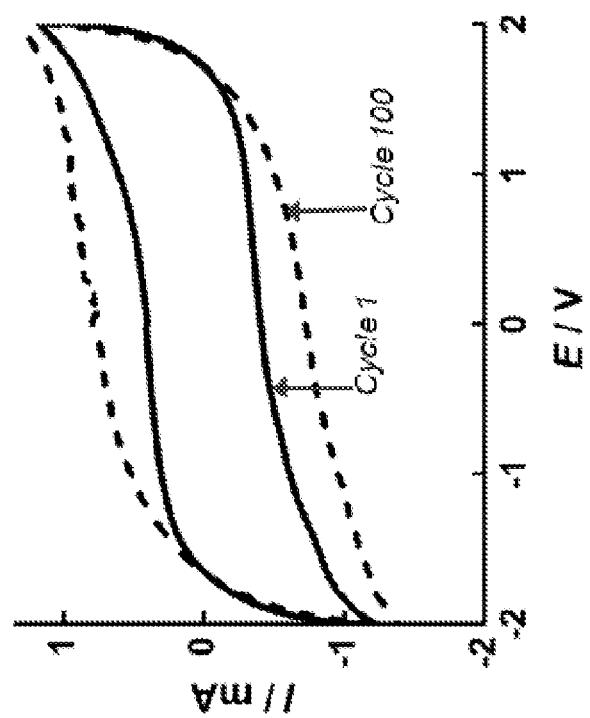
FIG. 3 is a plot of the voltammetric response of a supercapacitor utilizing an ionic liquid electrolyte composed of hexyltriethylammonium cations and bis(trifluoromethylsulfonyl)imide anions operating over a 4V range at 220° C.

FIG. 3 shows a plot of the voltammetric response of the supercapacitor over a 4V range at 220° C. From the plot it can be seen that the supercapacitor stably operates over many cycles at high temperature and over a wide voltage range (4V). This experiment was terminated arbitrarily after 100 cycles.

Example 2

Ionic liquid gels were formed by the addition of fumed silica (Sigma-Aldrich, Product No. S5130) to various ionic liquids. The ionic liquids used were either triethylsulfonium bis(trifluoromethylsulfonyl)imide, hexyltriethylammonium bis(trifluoromethylsulfonyl)imide, or butyltrimethylammonium bis(trifluoromethylsulfonyl)imide. The amount of fumed silica mechanically dispersed into the ionic liquid was either 7.5 weight % of the total weight of the electrolyte phase. In some cases, the amount of fumed silica was doubled and ferrocene (10 mM) was added as a redoxactive test reagent.

Figure 4:
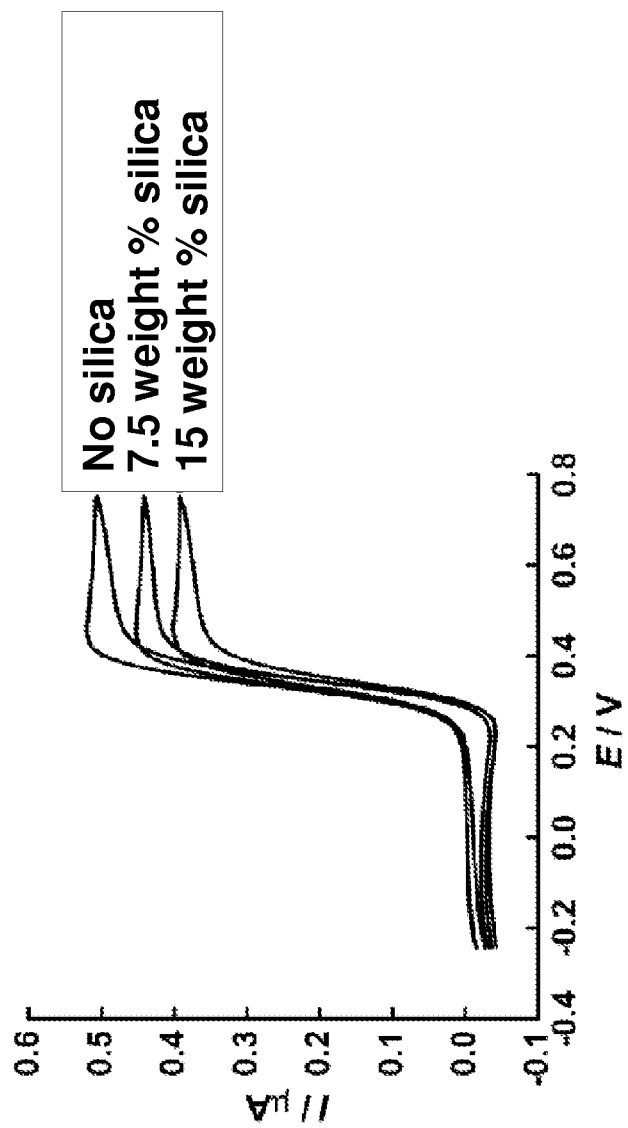
FIG. 4 is a plot of the voltammetric response of ferrocene in gelled triethylsulfonium bis(trifluoromethylsulfonyl)imide.

FIG. 4 shows a plot of the voltammetry of the ferrocene in triethylsulfonium bis(trifluoromethylsulfonyl)imide containing no silica, hydrophilic silica nanoparticles (S5130) in the amount of 7.5 weight % of the total weight of the electrolyte phase, and hydrophilic silica nanoparticles (S5130) in the amount of 15 weight % of the total weight of the electrolyte phase. Voltammetry was recorded using a RAM™ electrode (770 carbon microdisks, each of 7 μm diameter). The counter electrode was platinum gauze (A=4.0 cm2). The potential was cycled from −0.25 V to +0.75 V to −0.25 V at 20 mV s-1. Scans were recorded at 25° C. following 30 seconds conditioning at −0.25 V vs Ag|AgCl. Shown in FIG. 4 are the first scans. For each scan, 3277 data points were collected and smoothed using a 21-point moving average to diminish mains interference.

It can be seen from FIG. 4 that a small decrease in the voltammetric limiting current was observed as the amount of fumed silica in the gel was increased. However, the decrease was roughly in proportion to the volume fraction of silica suspended in the ionic liquid. This indicates that the internal diffusion of ions is not being inhibited by the silica particles, other than in proportion to the volume fraction unoccupied by silica. The same effect was found for the other ionic liquid electrolytes tested and when using both the hydrophilic and hydrophobic fumed silica gels on both the glassy carbon and the RAM electrodes, suggesting that the lack of diffusion inhibition by the silica particles is a general property of ionic-liquid/fumed silica gels. This result demonstrates that ionic liquids can maintain their electrolyte performance even after gelling.

Embodiments of the present disclosure may provide at least one of the following advantages. For example, the ionic liquid electrolytes used in the electric double layer capacitor may advantageously allow, due to their inherently low vapor pressure, for a supercapacitor to be operable at the high temperature ranges (20° C. to 220° C.) and pressures, which are experienced in a downhole environment. Additionally, the asymmetric alkyl cations allow the supercapacitor to function successfully over a wide voltage range (0 to 4 volts).

While the invention has been described with respect to a limited number of embodiments, those skilled in the art, having benefit of this disclosure, will appreciate that other embodiments can be devised which do not depart from the scope of the invention as disclosed herein. Accordingly, the scope should be limited by the attached claims. It is the express intention of the applicant not to invoke 35 U.S.C. §112, paragraph 6 for any limitations of any of the claims herein, except for those in which the claim expressly uses the words 'means for' together with an associated function.

What is claimed:

1. A supercapacitor device, comprising:
   a housing; and
   at least one supercapacitor cell disposed in the housing, the supercapacitor cell comprising:
   two working electrode layers separated by an electrode separator wherein each working electrode layer is electrically connected to a current collector;
   and
   an ionic liquid electrolyte disposed within the area occupied by the working electrode layers and the electrode separator, wherein the ionic liquid electrolyte has at least one cationic component comprising a central cation with an asymmetric arrangement of substituents bonded thereto, wherein the cationic component has the generic formula $(Rx)n\ Z+$ where $Z+$ is the ammonium, phosphonium, or sulfonium cation, the Rx substituents are linear or branched alkyl groups comprising 1-12 carbon atoms and may be the same alkyl group or different alkyl groups, n=4 for the ammonium and phosphonium cations, and n=3 for the sulfonium cation.

2. The supercapacitor device of claim 1, wherein at least one of the alkyl groups is larger than the others.

3. The supercapacitor device of claim 1, wherein the ionic liquid electrolyte comprise hexyltriethylammonium cations and/or butyltrimethylammonium cations paired with bis(trifluoromethylsulfonyl)imide anions.

4. The supercapacitor device of claim 1, further comprising a silica gellant added to the ionic liquid electrolyte in the amount from about 1 to 15 weight % of the total weight of the electrolyte phase.

5. The supercapacitor device of claim 1, wherein the inert substrate comprises a glassy or polymeric material.

6. The supercapacitor device of claim 1, wherein the current collector comprises a conducting material chosen from carbon, aluminum, gold, silver, copper, or mixtures thereof.

7. The supercapacitor device of claim 1, wherein the electrolyte-impervious layer comprises a non-porous carbonaceous layer.

8. The supercapacitor device of claim 1, wherein the working electrode layers comprise a porous carbonaceous material.

9. The supercapacitor device of claim 1, wherein the electrode separator comprises glass fiber.

10. The supercapacitor device of claim 1, wherein a plurality of said supercapacitors are connected in series or parallel.

11. The supercapacitor device of claim 1, further comprising an aqueous or non-aqueous diluent mixed with the ionic liquid electrolyte.

12. A downhole system having a supercapacitor device, comprising:
   at least one downhole tool disposed within a wellbore;
   a supercapacitor device in electrical connection with the at least one downhole tool;
   wherein the supercapacitor comprises the supercapacitor of claim 1.

13. The downhole system of claim 12, further comprising at least one motor in electrical connection with the supercapacitor device.

14. The supercapacitor device of claim 1, wherein each current collector is supported on an inert substrate layer.

15. The supercapacitor device of claim 1, further comprising:
an electrolyte-impervious layer disposed between each working electrode layer and each conducting layer to protect the conducting layer.

16. A supercapacitor device, comprising:
a housing; and
at least one supercapacitor cell disposed in the housing, the supercapacitor cell comprising:
two working electrode layers separated by an electrode separator wherein each working electrode layer is electrically connected to a current collector;
and
an electrolyte disposed within the area occupied by the working electrode layers and the electrode separator, the electrolyte comprising a continuous phase of an inert ionic liquid, wherein a cationic component of the inert ionic liquid has sufficiently large alkyl group substituents that the probability of electron tunneling is diminished.

17. The supercapacitor device of claim 16, wherein the inert ionic liquid comprises hexyltriethylammonium cations and/or butyltrimethylammonium cations paired with bis(trifluoromethylsulfonyl)imide anions.

18. The supercapacitor device of claim 16, further comprising a silica gellant added to the inert ionic liquid in the amount from about 1 to 15 wt % of the total weight of the electrolyte phase.

19. The supercapacitor device of claim 16, further comprising an aqueous or non-aqueous diluent added to the inert ionic liquid.

20. The supercapacitor device of claim 16, wherein one of the alkyl group substituents is larger than others of the alkyl group substituents.

21. The supercapacitor device of claim 16, wherein each current collector is supported on an inert substrate layer.

22. The supercapacitor device of claim 16, further comprising:
an electrolyte-impervious layer disposed between each working electrode layer and each conducting layer to protect the conducting layer.

23. The supercapacitor device of claim 22, wherein each current collector is supported on an inert substrate layer.

24. The supercapacitor device of claim 22, further comprising:
an electrolyte-impervious layer disposed between each working electrode layer and each conducting layer to protect the conducting layer.

25. A supercapacitor device, comprising:
a housing; and
at least one supercapacitor cell disposed in the housing, the supercapacitor cell comprising:
two working electrode layers separated by an electrode separator wherein each working electrode layer is electrically connected to a current collector; and
an electrolyte disposed within the area occupied by the working electrode layers and the electrode separator, the electrolyte comprising a continuous phase of an inert ionic liquid, wherein the continuous phase of inert ionic liquid is comprised of at least one substituted central cation.

26. The supercapacitor device of claim 25, wherein the at least one substituted central cation is substituted by linear or branched alkyl groups comprising from 1-12 carbons.

27. The supercapacitor device of claim 26, wherein at least one of the alkyl groups is larger than the others.

* * * * *